US012441962B2

(12) United States Patent
Neubauer et al.

(10) Patent No.: US 12,441,962 B2
(45) Date of Patent: Oct. 14, 2025

(54) DETERGENT CONTAINING A PHOTOACTIVATED STAIN REMOVAL INGREDIENT COMPRISING A COLORANT-FUNCTIONALIZED COPOLYMER

(71) Applicant: Henkel AG & Co. KGaA, Duesseldorf (DE)

(72) Inventors: Kira Neubauer, Wuppertal (DE); Christian Kropf, Hilden (DE); Nadia Ledermann, Duisburg (DE); Christopher Winfried Barner-Kowollik, Gaythorne (AU); Kai Mundsinger, Milton (AU); Brian Tyler Tuten, Milton (AU)

(73) Assignee: Henkel AG & Co. KGaA, Duesseldorf (DE)

( * ) Notice: Subject to any disclaimer, the term of this patent is extended or adjusted under 35 U.S.C. 154(b) by 320 days.

(21) Appl. No.: 18/344,525

(22) Filed: Jun. 29, 2023

(65) Prior Publication Data
US 2024/0002756 A1  Jan. 4, 2024

(30) Foreign Application Priority Data

Jun. 29, 2022  (DE) .................. 102022206619.7

(51) Int. Cl.
*C11D 3/37*   (2006.01)
*C11D 3/00*   (2006.01)
*C11D 3/395*  (2006.01)
*C11D 3/40*   (2006.01)

(52) U.S. Cl.
CPC .......... *C11D 3/3765* (2013.01); *C11D 3/0063* (2013.01); *C11D 3/395* (2013.01); *C11D 3/40* (2013.01); *C11D 2111/12* (2024.01)

(58) Field of Classification Search
CPC ....... C11D 3/40; C11D 3/3765; C11D 3/0063; C11D 2111/12
See application file for complete search history.

(56) References Cited

U.S. PATENT DOCUMENTS

| 4,070,296 A * | 1/1978 | Gibson | C09B 69/10 430/108.22 |
| 2004/0125338 A1* | 7/2004 | Phelan | C09D 11/36 523/160 |
| 2005/0176847 A1* | 8/2005 | Cagle | C09D 11/322 523/160 |
| 2006/0135705 A1* | 6/2006 | Vallance | C08F 290/062 525/391 |
| 2007/0065743 A1* | 3/2007 | Huang | C09B 67/0063 430/108.2 |
| 2009/0137172 A1* | 5/2009 | Huang | C08K 3/013 524/157 |
| 2012/0090102 A1 | 4/2012 | Batchelor | |
| 2014/0204149 A1 | 7/2014 | Yokoi | |

FOREIGN PATENT DOCUMENTS

WO   2020001864 A1   1/2020

OTHER PUBLICATIONS

Yoo Seok Lee, et al., Electroenzymatic Nitrogen Fixation Using a MoFe Protein System Immobilized in an Organic Redox Polymer, Angew. Chem. Int. Ed., 2020, 59, 16511-16516, Wiley-VCH Verlag Gmbh & Co. KGaA, Weinheim, www.angewandte.org.
European Patent Office, European Search Report, EP 23175935, Oct. 19, 2023, pp. 1-7, The Hague, Netherlands.

* cited by examiner

*Primary Examiner* — Charles I Boyer
(74) *Attorney, Agent, or Firm* — P. Scott Smith

(57) ABSTRACT

The present invention relates to laundry detergents which contain a cross-linked polymer obtained by a) copolymerizing monomers of general formula (I) and of general formula (II), and b) crosslinking the copolymer with a polythiol crosslinker and functionalizing with a compound of general formula (III). The present invention further relates to a process of laundering fabrics with the laundry detergent and irradiating with visible light. This shows improved attack on stains on fabric.

12 Claims, No Drawings

DETERGENT CONTAINING A PHOTOACTIVATED STAIN REMOVAL INGREDIENT COMPRISING A COLORANT-FUNCTIONALIZED COPOLYMER

FIELD OF THE INVENTION

Liquid washing agents are known in the art and have become increasingly popular with consumers in recent years because they offer several advantages over solid washing agents. These include simpler dosing and generally more rapid dissolution in the washing liquor. In addition, they are often perceived as safer and less aggressive towards textiles and the environment.

BACKGROUND OF THE INVENTION

Liquid detergents, however, have the disadvantage that not all of the ingredients that are established in solid washing and cleaning agents and the performance upon which the user relies can be incorporated into these agents in a stable manner. For example, the incorporation of an effective bleaching system, which, in solid agents, usually consists of a peroxidic bleaching agent and a bleach activator that forms a peroxycarboxylic acid under perhydrolysis conditions, is problematic in liquid agents, because the stability of the bleach activator against hydrolytic attack usually cannot be sufficiently ensured, in particular in aqueous agents. In addition, the presence of oxidative bleaching agents can adversely affect the stability of other washing and cleaning agent ingredients, such as dyes, fragrances, or enzymes. For this reason, various proposals have been made to separate the components of liquid agents which are not very compatible with one another by providing multi-compartment packaging for corresponding partial components of the finished agent, for example, multi-chamber bottles from which the partial components are dosed together, or multi-chamber bags made of water-soluble film material, from the individual chambers of which the partial components are released simultaneously or in succession by dissolving the chamber walls.

A further known embodiment of this separation principle consists in wrapping at least one of the problematic ingredients with a protective layer that surrounds the ingredient during the preparation and storage of the liquid agent and prevents contact with negatively interacting other ingredients, but breaks open under application conditions and releases the ingredient, so that said ingredient can contribute to the cleaning result of the detergent. Usually, differences in concentration between the liquid detergent and the washing liquid are used to dissolve the wrapping layer only under conditions of use of the agent.

Although the problem of loss of activity of mutually incompatible ingredients is less prone in solid detergents, even for those it is desirable to increase their shelf-life.

BRIEF DESCRIPTION OF THE INVENTION

In contrast to the known solutions substantially based on different water solubilities at different concentrations or at different pH values, the present invention uses targeted energy input to produce an active ingredient from an ingredient that is stable and inactive when the detergent is stored in the absence of such energy input.

DETAILED DESCRIPTION OF THE INVENTION

The invention relates to a laundry detergent, comprising a cross-linked polymer obtainable by a) copolymerizing monomers of general formula (I) and general formula (II)

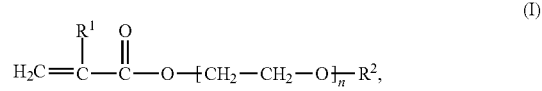
(I)

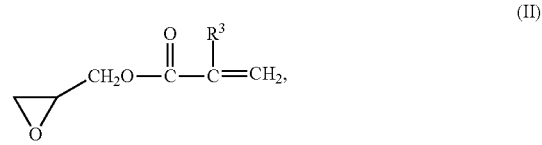
(II)

in which $R^1$, $R^2$, and $R^3$, independently of each other, are H or $CH_3$, and n is a number in the range of from 1 to 90, preferably from 5 to 50, b) crosslinking the copolymer with a polythiol crosslinker and functionalizing with a compound of general formula (III),

(III), in which $R^4$ is an alkyl group with from 2 to 12 carbon atoms, preferably with from 6 to 10 carbon atoms, and Z is a colorant compound, being linked by one of its N- or O-atoms to $R^4$.

The polymer may bear initiator groups at the chain ends, stemming from any radical chain initiator molecule starting the copolymerization in step a).

Such polymers generate species that attack stains on fabrics when irradiated with visible light. In the absence of such irradiation, they are sufficiently inert to not destroy any other ingredient of detergents they are formulated with and are not destroyed by other ingredients of detergents during storage.

The invention also relates to the use of such a cross-linked polymer to increase the detergency of laundry detergents when laundering fabrics in an aqueous liquid, in particular against fatty stains situated on the fabrics.

The invention also relates to a process of laundering fabrics by contacting a fabric in need of cleaning with water and a detergent herein defined, and irradiating the aqueous liquid comprising the fabric and the detergent with electromagnetic radiation with wavelengths in the range of from 450 nm to 600 nm, preferably from 475 nm to 550 nm, and intensities in the range of from 50 $W/m^2$ to 6000 $W/m^2$, preferably from 586 $W/m^2$ to 662 $W/m^2$, for 5 minutes to 500 minutes, preferably from 30 minutes to 90 minutes. Such a method can be carried out manually or automatically, for example using a washing machine, the washing machine having a device for radiation of visible light, or the washing liquid, in particular when the method is carried out manually, being manually exposed to a radiation source emitting visible light. The method according to the invention can be carried out at temperatures even below room temperature, in particular when using cold water for preparing the aqueous washing liquid, or is preferably carried out at temperatures in the range of from 5° C. to 60° C., in particular from 10° C. up to 40° C.

If desired, light can act on the liquid shortly before it is brought into contact with the fabric to be cleaned. It is preferable for the exposure to light to take place when the washing liquid is in contact with the textile to be washed; exposure to light is not necessary during the entire contact period, and exposure of the washing liquid can, if desired, begin even before contact between the washing liquid and the textile.

Visible light is electromagnetic radiation. According to the invention, preferably electromagnetic radiation is used which has wavelengths in the range of from 450 nm to 600 nm, in particular from 475 nm to 550 nm; it is further preferable for the maximum intensity of the radiation to be in the range mentioned. For example, conventional lamps or light-emitting diodes (LEDs), or even the sun can be used to generate the radiation that is essential to the invention. Light exposure times in the range of from 5 minutes to 5 hours, in particular from 30 minutes to 90 minutes, are normally completely sufficient. Intensities in the range of from 50 W/m² to 6000 W/m², preferably from 586 W/m² to 662 W/m², measured on the surface of the washing liquid, are normally completely sufficient.

The cross-linked polymer relevant for the current invention may be prepared by synthetic methods well known in the art. The colorant compound is a compound that absorbs electromagnetic radiation in the visible range and possesses a functional group that allows it to be connected to an organic unit, resulting in compounds of general formula (III). The colorant compound preferably is selected from

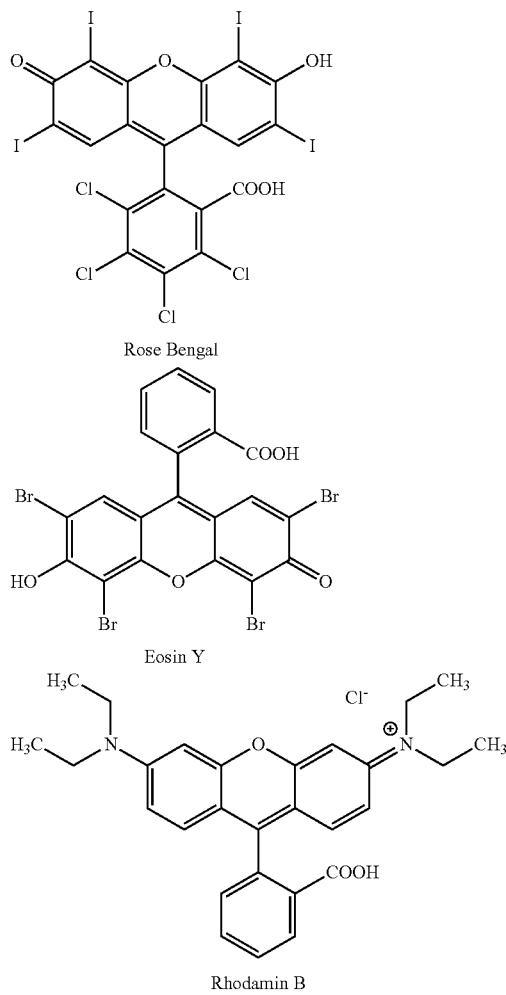

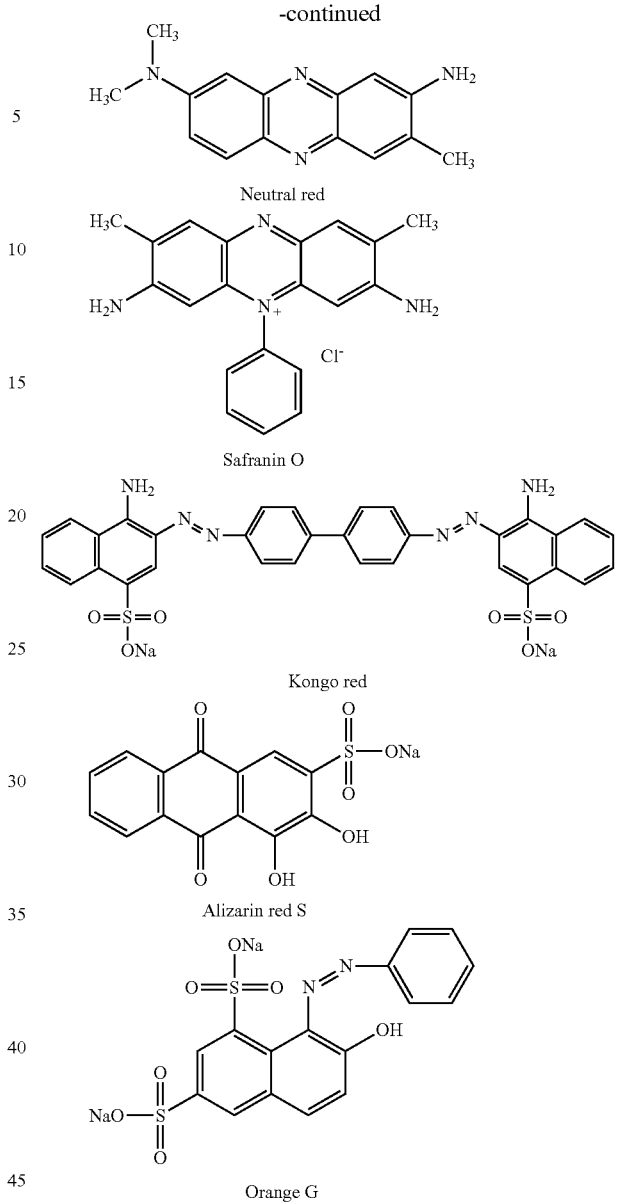

and mixtures thereof.

Among preferred cross-linked polymers are those which are obtainable by employing in the reaction step a) monomers of general formula (I) and monomers of general formula (II) in molar ratios of from 51:49 to 95:5, preferably from 70:30 to 80:20.

The monomer of general formula (I) is preferably selected from poly-(ethylene glycol)-monomethylether-monomethacrylate ($M_n$ 300 to 4000 g/mol), 2-methoxyethyl methacrylate, 2-(2-methoxyethoxy)-ethyl methacrylate, ethylene glycol methacrylate, 2-methoxyethyl acrylate, ethylene glycol monoacrylate, and mixtures thereof.

The mean molecular weight (number average) of the copolymer of step a) preferably is in the range of from 15 000 g/mol to 120 000 g/mol, preferably from 45 000 g/mol to 90 000 g/mol.

The thiol cross-linker of step b) preferably is selected from pentaerythritol tetrakis(3-mercaptopropionate), 1,1,1-tris-(hydroxymethyl)-propan-tris-(3-mercaptopropionate), ethylene glycol-bis-mercaptoacetate, tetra(ethylene glycol)

dithiol, ethylene mercaptan, 1,3-dimercapto-propan, 1,4-dimercapto-butan, 1,6-dimercapto-hexan, 1,8-dimercapto-octan, and mixtures thereof.

"At least one," as used herein, refers to one or more, for example, 1, 2, 3, 4, 5, 6, 7, 8, 9, or more. In connection with constituents of the compositions described herein, this information does not refer to the absolute amount of molecules, but the type of the constituent. "At least one non-ionic surfactant" therefore means, for example, one or more different non-ionic surfactants, i.e. one or more different types of non-ionic surfactants. Together with stated amounts, the stated amounts refer to the total amount of the correspondingly designated type of constituent, as defined above.

The detergent according to the present invention preferably comprises the cross-linked polymer in amounts of from 0.5% by weight to 0.001% by weight, preferably from 0.13% by weight to 0.013% by weight. It contains for example 1 wt. % to 60 wt. %, preferably 5 wt. % to 45% wt. % and, more preferred, 15 wt. % to 40 wt. % of at least one surfactant. The concentration of the detergent in the aqueous washing liquid preferably is in the range of from 0.03 mg/l to 15 mg/l, more preferably from 0.4 mg/l to 4 mg/l.

Non-ionic surfactants that can be used include all known non-ionic surfactants commonly used in washing or cleaning agents, in particular those selected from the group consisting of alkyl glycol ethers, alkoxylated fatty alcohols, alkoxylated oxo alcohols, alkoxylated fatty acid alkyl esters, fatty acid amides, alkoxylated fatty acid amides, polyhydroxy fatty acid polyglycol amides, alkylphenol amide, amine oxides, alkyl(poly)glucosides and mixtures thereof. In a preferred embodiment of the invention, the agents contain, as a non-ionic surfactant, at least one fatty alcohol alkoxylate having the following formula $R^1$—O-(AO)$_m$—H, in which $R^1$ is a linear or branched, substituted or unsubstituted alkyl functional group, AO is an ethylene oxide (EO) or propylene oxide (PO) group, and m is an integer from 1 to 50. In a preferred embodiment of the present invention, $R^1$ is a linear or branched alkyl functional group having 5 to 30 C atoms, preferably 7 to 25 C atoms, and in particular 10 to 19 carbon atoms. Preferred functional groups $R^1$ are selected from decyl, undecyl, dodecyl, tridecyl, tetradecyl, pentadecyl, hexadecyl, heptadecyl, octadecyl, nonadecyl functional groups, and mixtures thereof, the representatives having an even number of C atoms being preferred. Particularly preferred functional groups $R^1$ are derived from fatty alcohols having 12 to 19 C atoms, for example from coconut fatty alcohol, tallow fatty alcohol, lauryl, myristyl, cetyl, or stearyl alcohol, or from oxo alcohols having 10 to 19 C atoms. AO is an ethylene oxide (EO) or propylene oxide (PO) group, preferably an ethylene oxide group. The index m is an integer from 1 to 50, preferably from 2 to 20, and more preferably from 2 to 10. In particular, m is 3, 4, 5, 6, or 7. The agent according to the invention may contain mixtures of nonionic surfactants having different degrees of ethoxylation. Surfactants having degrees of alkoxylation/ethoxylation of at least 5 are preferred. In summary, particularly preferred fatty alcohol alkoxylates are those of the formula:

where k=9 to 17, and m=3, 4, 5, 6, or 7. Very particularly preferred representatives are fatty alcohols having 10 to 18 C atoms and 7 EO (k=11 to 17, m=7). Fatty alcohol ethoxylates of this kind are available under the trade names Dehydol® LT7 (BASF SE), Lutensol® AO7 (BASF SE), Lutensol® M7 (BASF SE), and Neodol® 45-7 (Shell Chemicals). The above-mentioned fatty alcohol ethoxylates preferably have degrees of ethoxylation of at least 5, preferably 7. Such fatty alcohol ethoxylates can be used alone, as mixtures of such fatty alcohol ethoxylates, or as mixtures with lower-ethoxylated fatty alcohol ethoxylates such as Lutensol® A03 (BASF). In such mixtures, it is preferred for the fatty alcohol ethoxylates to have degrees of ethoxylation of at least 5, preferably 7, at least 50 wt. %, preferably at least 75 wt. %, to make up the total amount of fatty alcohol ethoxylates.

Further nonionic surfactants which may be contained in the detergents within the meaning of the present invention include, but are not limited to, alkyl(poly)glycosides, alkoxylated fatty acid alkyl esters, fatty acid alkanolamides, hydroxy mixed ethers, sorbitan fatty acid esters and polyhydroxy fatty acid amides. Suitable alkyl(poly)glycosides are, for example, those of the formula $R^2$O-[G]$_p$, in which $R^2$ is a branched alkyl having 12 to 16 carbon atoms, G is a sugar residue having 5 or 6 carbon atoms, in particular glucose, and the index p is 1 to 10. These can be contained in the detergent in amounts of up to 5 wt. %, for example.

Furthermore, the detergent according to the present invention preferably contains 1 wt. % to 30 wt. %, in particular, 2 wt. % to 20 wt. % and particularly preferably at least 10 wt. %, of at least one anionic surfactant. The anionic surfactants are preferably surfactants from the group of the sulfonates, in particular, alkyl benzene sulfonates and/or secondary alkane sulfonates. In one embodiment, the agent according to the invention comprises at least one secondary alkane sulfonate. The, at least, secondary alkane sulfonate can be any known secondary alkane sulfonate that is suitable for the purpose according to the invention. "Secondary" refers to the generally known chemical meaning of this term and indicates that the carbon atom to which the sulfonate group is covalently bonded still has two covalent bonds to two organic functional groups and one covalent bond to a hydrogen atom. Together with the carbon atom to which they are bonded, the two organic groups form a linear or branched alkyl group having 1 to 50 carbon atoms. To balance the negative charge of the sulfonate group, the alkane sulfonate further comprises any cation, preferably selected from the group Na$^+$, K$^+$, NH$_4^+$, ½ Zn$^{2+}$, ½ Mg$^{2+}$, ½ Ca$^{2+}$, ½ Mn$^{2+}$ and mixtures thereof, particularly preferably Na$^+$. Alternatively, the corresponding acid can also be used in various embodiments, i.e. the cation is H$^+$. In a preferred embodiment of the present invention, the at least one secondary alkane sulfonate has the formula $R^1$CH(SO$_3^-$X$^+$)R$^2$ where each of $R^1$ and $R^2$ is independently a linear or branched alkyl having 1 to 20 carbon atoms and, together with the carbon atom to which they are bonded, form a linear or branched alkyl group, preferably having 10 to 30 carbon atoms, more preferably having 10 to 20 carbon atoms, and X$^+$ is selected from the group Na$^+$, K$^+$, NH$_4^+$, ½ Zn$^{2+}$, ½ Mg$^{2+}$, ½ Ca$^{2+}$, ½ Mn$^{2+}$ and mixtures thereof, preferably Na$^+$. As already mentioned above, X$^+$ can also be H$^+$ in various embodiments. In another preferred embodiment, the at least one secondary alkane sulfonate has the following formula

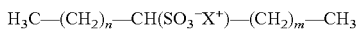   (5)

where m and n are each, independently of one another, an integer between 0 and 20. Preferably, m+n is an integer between 7 and 17, preferably 10 to 14, and $X^+$ is selected from the group $Na^+$, $K^+$, $NH_4^+$, $\frac{1}{2} Zn^{2+}$, $\frac{1}{2} Mg^{2+}$, $\frac{1}{2} Ca^{2+}$, $\frac{1}{2} Mn^{2+}$ and mixtures thereof, preferably $Na^+$. As already mentioned above, $X^+$ can also be $H^+$ in various embodiments. In a particularly preferred embodiment, at least one secondary alkane sulfonate is secondary $C_{14-17}$ sodium alkane sulfonate or the corresponding acid. A secondary $C_{14-17}$ sodium alkane sulfonate of this kind is marketed, for example, by Clariant under the trade name "Hostapur SAS60." At this point, it should be expressly noted that the agent described herein may contain a plurality of secondary alkane sulfonates.

Furthermore, in various embodiments, the detergent described herein may contain other anionic surfactants which can be used as an alternative or in addition to the secondary alkane sulfonates. Such anionic surfactants preferably include alkyl benzene sulfonates. Alkylbenzene sulfonates are preferably selected from linear or branched alkylbenzene sulfonates of the formula

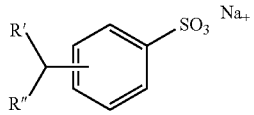

in which R' and R" are, independently of one another, hydrogen or alkyl, and together contain 9 to 19, preferably 9 to 15, and in particular 9 to 13, carbon atoms. A very particularly preferred representative is sodium dodecylbenzene sulfonate or the corresponding acid (HLAS). In other embodiments, $Na^+$ can be replaced by a cation selected from $K^+$, $NH_4^+$, $\frac{1}{2} Zn^{2+}$, $\frac{1}{2} Mg^{2+}$, $\frac{1}{2} Ca^{2+}$, $\frac{1}{2} Mn^{2+}$, and mixtures thereof, or also by $H^+$ (corresponding acid). In preferred embodiments, the secondary alkane sulfonates and alkyl benzene sulfonates described above are used in combination, in particular in a weight ratio of from 2:1 to 1:2, preferably 1:1. It is particularly preferred to use the alkylbenzene sulfonates in the acid form.

Finally, the detergents may also contain further anionic surfactants, such as alkyl ether sulfates. Preferred are fatty alcohol ether sulfates of the following formula

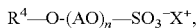

where $R^4$ is a linear or branched, substituted or unsubstituted alkyl group having 5 to 30 carbon atoms, preferably having 7 to 25 carbon atoms, and more preferably having 10 to 19 carbon atoms. Furthermore, AO in the above formula represents an ethylene oxide (EO) or propylene oxide (PO) group, preferably an ethylene oxide (EO) group, and n is an integer from 1 to 50, preferably from 1 to 20 and more preferably from 2 to 10. $X^+$ is any cation and is preferably selected from the group $Na^+$, $K^+$, $NH_4^+$, $\frac{1}{2} Zn^{2+}$, $\frac{1}{2} Mg^{2+}$, $\frac{1}{2} Ca^{2+}$, $\frac{1}{2} Mn^2$, and mixtures thereof, particularly preferably $Na^+$. In a preferred embodiment, $R^4$ is a linear or branched alkyl functional group having 5 to 30 carbon atoms, preferably 7 to 25 carbon atoms, and in particular 10 to 19 carbon atoms. Preferred functional groups $R^4$ are selected from decyl, undecyl, dodecyl, tridecyl, tetradecyl, pentadecyl, hexadecyl, heptadecyl, octadecyl, nonadecyl functional groups, and mixtures thereof, the representatives having an even number of carbon atoms being preferred. Particularly preferred functional groups $R^4$ are derived from fatty alcohols having 12 to 19 carbon atoms, for example from coconut fatty alcohol, tallow fatty alcohol, lauryl, myristyl, cetyl, or stearyl alcohol, or from oxo alcohols having 10 to 19 carbon atoms. The agent may contain mixtures of surfactants having different degrees of alkoxylation n. The fatty alcohol ether sulfate used can also be one of the formula

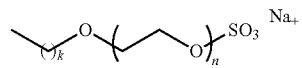

where k=11 to 19, and n=2, 3, 4, 5, 6, 7 or 8. Very particularly preferred representatives are Na fatty alcohol ether sulfates having 12 to 18 carbon atoms and 2 EO (k=11 to 13, n=2). The degree of ethoxylation n indicated represents a statistical average that can correspond to an integer or a fractional number for a specific product. In general, the degrees of alkoxylation indicated represent statistical averages that can correspond to an integer or a fractional number for a specific product. Preferred alkoxylates/ethoxylates have a narrowed homolog distribution (narrow range ethoxylates, NRE).

In addition, the detergent may contain at least one fatty acid. The term "fatty acid," as used herein, refers to branched or unbranched carboxylic acids and the salts thereof, which are referred to as soaps, having 6 to 22, preferably 12 to 18, carbon atoms. The fatty acid soaps can be present in the form of sodium, potassium or magnesium, or ammonium salts thereof. In saponified form, they are preferably in the form of sodium salts and/or ammonium salts thereof. Amines that can be used for neutralization are preferably choline, triethylamine, monoethanolamine, diethanolamine, triethanolamine, methylethylamine, or a mixture thereof, monoethanolamine being preferred. In various embodiments, the fatty acids are used as such, that is they are not saponified before their incorporation into the detergent. For example, they can be dissolved in one or more constituents of the detergent, preferably at least one non-ionic surfactant, and combined in this dissolved form with the other constituents of the detergent. The fatty acid can be present in the final product in emulsified form if the product is liquid.

Preferred liquid detergents also contain water as a solvent. In embodiments of the invention, the detergents contain 4 wt. % to 25 wt. %, in particular, 6 wt. % to 15 wt. %, water; in other embodiments of the invention, the detergents contain more than 25 wt. % and up to 90 wt. % water, in particular, 35 wt. % to 65 wt. % water. The liquid detergents may also contain one or more non-aqueous, organic solvents. Suitable non-aqueous solvents include monovalent or polyvalent alcohols, alkanol amines, or glycol ethers. Preferably, the solvents are selected from ethanol, n-propanol, i-propanol, butanols, glycol, propanediol, butanediol, methyl propanediol, glycerol, glycols, such as diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, propylene-glycol-t-butyl ether, di-n-octyl ether, and low-molecular polyalkylene glycols, such as PEG 400, and mixtures thereof. In a preferred embodiment, the non-aqueous solvent is selected from the group consisting of ethanol, n-propanol, i-propanol, butanols, glycol, propanediol, butanediol, methyl propanediol, glycerol, and mixtures thereof. In a preferred embodiment, the non-aqueous solvent contains 1,2-propanediol, glycerol, or a mixture thereof, very particularly preferably glycerol.

Liquid detergents according to the invention preferably have a viscosity (Brookfield rotational viscometer; spindle adapted to the viscosity range) in the range of from 1 mPa·s to 1000 mPa·s, in particular from 5 mPa·s to 500 mPa·s. A liquid detergent according to the invention is also preferably translucent, in particular transparent, i.e. it has no optically perceptible cloudiness. The pH of a liquid detergent according to the invention can be adjusted by means of conventional pH regulators and is preferably in the range of from pH 5 to pH 10, in particular from pH 7 to pH 9; these relate to the pH of a 1% (wt. %) solution of the detergent in distilled water at 30° C., and solid detergents according to the present invention preferably show a pH in the same range at the same concentration range.

Suitable pH adjusters include acids and/or alkalis. Suitable acids are organic acids, such as acetic acid, glycolic acid, lactic acid, succinic acid, adipic acid, malic acid, tartaric acid, and gluconic acid, or sulfamic acid. In addition, however, the mineral acids hydrochloric acid, sulfuric acid, and nitric acid or mixtures thereof can also be used. Suitable bases originate from the group of alkali and alkaline-earth metal hydroxides and carbonates, in particular alkali metal hydroxides, of which potassium hydroxide and especially sodium hydroxide are preferred. Volatile alkali can also be used, for example in the form of ammonia and/or alkanolamines which can contain up to 9 carbon atoms in the molecule. The alkanolamine is preferably selected from the group consisting of mono-, di-, triethanol- and propanolamine and mixtures thereof.

In addition, the detergent may also contain other ingredients which further improve its practical and/or aesthetic properties. In the context of the present invention, the detergent preferably additionally contains one or more substances from the group of enzymes, builders, complexing agents, electrolytes, perfumes, perfume carriers, fluorescing agents, dyes, hydrotropic substances, suds suppressors, silicone oils, anti-redeposition agents, graying inhibitors, anti-shrink agents, anti-crease agents, dye transfer inhibitors, antimicrobial active ingredients, germicides, fungicides, antioxidants, preservatives, corrosion inhibitors, antistatic agents, bittering agents, ironing aids, repellents and impregnating agents, swelling and anti-slip agents, softening components and UV absorbers.

The detergents preferably contain at least one enzyme. The at least one enzyme can be any enzyme known in the art that can develop a catalytic activity in a washing process and includes, but is not limited to, proteases, amylases, lipases, cellulases, hemicellulases, mannanases, pectin-cleaving enzymes, tannases, xylanases, xanthanases, β-glucosidases, carrageenases, perhydrolases, oxidases, oxidoreductases and mixtures thereof. In a preferred embodiment, the at least one enzyme is selected from the group consisting of proteases, amylases, lipases, cellulases, and mixtures thereof. These enzymes are in principle of natural origin; however, starting from the natural molecules, variants that have been improved for use in washing or cleaning agents are available, which are preferably used accordingly.

Among the proteases, the subtilisin-type proteases are preferred. Examples of these are the subtilisins BPN' and Carlsberg, protease PB92, subtilisins 147 and 309, the alkaline protease from *Bacillus lentus*, subtilisin DY, and the enzymes thermitase, proteinase K, and proteases TW3 and TW7, which belong to the subtilases but no longer to the subtilisins in the narrower sense. Subtilisin Carlsberg is available in a developed form under the trade name Alcalase® from Novozymes A/S, Bagsvaerd, Denmark. Subtilisins 147 and 309 are marketed by Novozymes under the trade names Esperase® and Savinase®, respectively. The protease variants marketed under the name BLAP® are derived from the protease from *Bacillus lentus* DSM 5483. Other proteases that can be used are, for example, the enzymes available under the trade names Durazym®, Everlase®, Nafizym®, Natalase®, Kannase®, and Ovozyme® from Novozymes, the enzymes available under the trade names Purafect®, Purafect® OxP, Purafect® Prime, Excellase®, and Properase® from Genencor, the enzyme available under the trade name Protosol® from Advanced Biochemicals Ltd., Thane, India, the enzyme available under the trade name Wuxi® from Wuxi Snyder Bioproducts Ltd., China, the enzymes available under the trade names Proleather® and Protease P® from Amano Pharmaceuticals Ltd., Nagoya, Japan, and the enzyme available under the name Proteinase K-16 from Kao Corp., Tokyo, Japan. The proteases from *Bacillus gibsonii* and *Bacillus pumilus* are particularly preferably used.

Examples of amylases are α-amylases from *Bacillus licheniformis*, from *B. amyloliquefaciens*, or from *B. stearothermophilus*, as well as the developments thereof that have been improved for use in washing or cleaning agents. The enzyme from *B. licheniformis* is available from Novozymes under the name Termamyl® and from Genencor under the name Purastar® ST. Development products of this α-amylase are available from Novozymes under the trade names Duramyl® and Termamyl® ultra, from Genencor under the name Purastar® OxAm, and from Daiwa Seiko Inc., Tokyo, Japan, as Keistase®. The α-amylase from *B. amyloliquefaciens* is marketed by Novozymes under the name BAN®, and derived variants from the α-amylase from *B. stearothermophilus* are marketed under the names BSG® and Novamyl®, also by Novozymes. Others that are particularly noteworthy for this purpose are the α-amylases from *Bacillus* sp. A 7-7 (DSM 12368) and cyclodextrin glucanotransferase (CGTase) from *B. agaradherens* (DSM 9948). Fusion products of all mentioned molecules can also be used. Furthermore, the developments of the α-amylase from *Aspergillus niger* and *A. oryzae*, available under the trade name Fungamyl® from Novozymes, are suitable. Other commercial products that can advantageously be used are, for example, Amylase-LT®, and Stainzyme® or Stainzyme Ultra® or Stainzyme Plus®, the latter also being from Novozymes. Variants of these enzymes that can be obtained by point mutations can also be used in detergents according to the invention.

Examples of lipases or cutinases that can be used, which are contained in particular due to their triglyceride-cleaving activities, are the lipases that can be originally obtained or developed from *Humicola lanuginosa* (*Thermomyces lanuginosis*), in particular those with the amino acid exchange D96L. These are marketed for example by Novozymes under the trade names Lipolase®, Lipolase® Ultra, LipoPrime®, Lipozyme®, and Lipex®. Moreover, the cutinases which have been originally isolated from *Fusarium solani pisi* and *Humicola insolens* can also be used, for example. Lipases that can also be used are available from Amano under the names Lipase CE®, Lipase P®, Lipase B®, and Lipase CES®, Lipase AKG®, *Bacillus* sp. Lipase®, Lipase AP®, Lipase M-AP® and Lipase AML®. From Genencor, the lipases or cutinases of which the starting enzymes have been isolated originally from *Pseudomonas mendocina* and *Fusarium solanii* can be used, for example. The preparations M1 Lipase® and Lipomax® were originally marketed by Gist-Brocades, the enzymes marketed by Meito Sangyo KK, Japan, under the names Lipase MY-30@, Lipase OF®, and Lipase PL®, and the product Lumafast® from Genencor should be mentioned as other important commercial products.

Depending on their purpose, cellulases can be present as pure enzymes, as enzyme preparations, or in the form of mixtures in which the individual components are advantageously complementary in terms of their different performance aspects. These performance aspects include in particular anything from contributions of the cellulase to the primary washing performance of the agent (cleaning performance), the secondary washing performance of the agent (anti-redeposition or graying inhibitors), and softening (effect on fabric), to producing a "stonewashed" effect. A usable fungal cellulase preparation that is rich in endoglucanase (EG) and the developments thereof are provided by Novozymes under the trade name Celluzyme®. The products Endolase® and Carezyme® also available from Novozymes are based on 50 kD-EG and 43 kD-EG, respectively, from *H. insolens* DSM 1800. Other commercial products from this company that can be used are Cellusoft®, Renozyme®, and Celluclean®. It is also possible to use, for example, 20 kD-EG from *Melanocarpus*, which are available from AB Enzymes, Finland under the trade names Ecostone® and Biotouch®. Other commercial products from AB Enzymes are Econase® and Ecopulp®. Other suitable cellulases are from *Bacillus* sp. CBS 670.93 and CBS 669.93, the cellulase from *Bacillus* sp. CBS 670.93 is available from Genencor under the trade name Puradax®. Other commercial products from Genencor are "Genencor detergent cellulase L" and IndiAge® Neutra. Variants of these enzymes that can be obtained by point mutations can also be used according to the invention. Particularly preferred cellulases are *Thielavia terrestris* cellulase variants, cellulases from *Melanocarpus*, in particular *Melanocarpus albomyces*, EGIII-type cellulases from *Trichoderma reesei*, or variants that can be obtained therefrom.

Furthermore, other enzymes which can be grouped under the term "hemicellulases" can be used in particular to remove specific problematic stains. These include, for example, mannanases, xanthan lyases, xanthanases, xyloglucanases, xylanases, pullulanases, pectin-cleaving enzymes, and β-glucanases. The β-glucanase obtained from *Bacillus subtilis* is available from Novozymes under the name Cereflo®. Hemicellulases that are particularly preferred according to the invention are mannanases that are marketed, for example, under the trade names Mannaway® by Novozymes or Purabrite® by Genencor. In the context of the present invention, the pectin-cleaving enzymes also include enzymes having the names pectinase, pectate lyase, pectin esterase, pectin demethoxylase, pectin methoxylase, pectin methylesterase, pectase, pectin methylesterase, pectinesterase, pectin pectyl hydrolase, pectin depolymerase, endopolygalacturonase, pectolase, pectin hydrolase, pectin polygalacturonase, endo-polygalacturonase, poly-α-1,4-galacturonide, glycanohydrolase, endogalacturonase, endo-D-galacturonase, galacturan 1,4-α-galacturonidase, exopolygalacturonase, poly(galacturonate) hydrolase, exo-D-galacturonase, exo-D-galacturonanase, exopoly-D-galacturonase, exo-poly-α-galacturonosidase, exopolygalacturonosidase, or exopolygalacturanosidase. Examples of enzymes that are suitable in this regard are available for example under the names Gamanase®, Pektinex AR®, X-Pect® or Pectaway® from Novozymes, under the names Rohapect UF®, Rohapect TPL®, Rohapect PTE100®, Rohapect MPE®, Rohapect MA plus HC, Rohapect DA12L®, Rohapect 10L©, Rohapect B1L® from AB Enzymes, and under the name Pyrolase® from Diversa Corp., San Diego, CA, USA.

The detergents contain the at least one enzyme preferably in total amounts established in the prior art. The at least one enzyme can therefore be contained in a total amount of from $1 \times 10^8$ to 5 wt. %, based on active protein, or in a total amount of from 0.001 to 3 wt. %, or 0.01 to 1.5 wt. %, or 0.05 to 1.25 wt. %. The stated amounts are to be understood such that each enzyme contained can be contained in the stated amounts. The enzymes are preferably used as an enzyme liquid formulation or formulations.

The at least one enzyme that preferably is present in the detergent supports the cleaning performance of the detergent on certain soiling or stains. A detergent according to the invention particularly preferably contains a plurality of enzymes, it being possible for the enzymes to belong to the same or different enzyme classes. Particularly preferably, the enzymes exhibit synergistic effects regarding their impact on specific stains or spots, i.e. the enzymes contained in the composition support one another in their performance.

In particular, polymers based on terephthalate-PEG can be used as anti-redeposition agents. Alternatively, (co)polymers based on polyethyleneimine, polyvinyl acetate, and polyethylene glycol can also be used.

Organic builders are particularly suitable as builders, for example, the polycarboxylic acids which can be used in the form of the sodium salts thereof or as acids, polycarboxylic acids being understood to mean those carboxylic acids that carry more than one acid function. These include, for example, adipic acid, succinic acid, glutaric acid, malic acid, tartaric acid, maleic acid, fumaric acid, saccharic acids, aminocarboxylic acids, in particular glutamic acid-N,N-diacetic acid (GLDA) and methylglycine-N,N-diacetic acid (MGDA), and mixtures thereof. Polymeric polycarboxylates are also suitable as builders. These are, for example, the alkali metal salts of polyacrylic acid or polymethacrylic acid, for example, those having a relative molecular mass of from 600 to 750,000 g/mol. Suitable polymers are in particular polyacrylates which preferably have a molecular mass of from 1,000 to 15,000 g/mol. Due to their superior solubility, the short-chain polyacrylates, which have molar masses of from 1,000 to 10,000 g/mol, and particularly preferably from 1,000 to 5,000 g/mol, can, in turn, be preferred from this group. In addition, copolymeric polycarboxylates are suitable, in particular those of acrylic acid with methacrylic acid and of acrylic acid or methacrylic acid with maleic acid. To improve water solubility, the polymers can also contain allyl sulfonic acids, such as allyloxybenzene sulfonic acid and methallyl sulfonic acid, as monomers. Soluble builders, such as acrylic polymers having a molar mass of from 1,000 to 5,000 g/mol, are preferably used in liquid detergents.

The detergents can additionally contain phosphonates, such as HEDP (1-hydroxyethane-1,1-diphosphonic acid) or DTPMP (diethylenetriamine penta(methylene phosphonate), as builders and complexing agents.

The detergents can be prepared by methods analogous to those known in the prior art. They can be placed into a water-soluble wrapping and thus be a constituent of a water-soluble packaging. If the detergent is packaged in a water-soluble wrapping, it is preferable for the water content to be less than 10 wt. %, based on the total detergent, and for the anionic surfactants to be present in the form of the ammonium salts thereof or as free acids. In addition to the detergent, a water-soluble packaging contains a water-soluble wrapping. The water-soluble wrapping is preferably formed by a water-soluble film material. Water-soluble packagings of this kind can be produced either by methods of vertical form fill sealing (VFFS) or by thermoforming methods. The thermoforming method generally includes forming a first layer from a water-soluble film material to produce bulges for receiving a composition, pouring the composition into the bulges, covering the bulges filled with the composition with a second layer made of a water-soluble film material, and sealing the first and second layers to one another at least around the bulges. The water-soluble wrapping is preferably made from a water-soluble film material selected from the group consisting of polymers or polymer mixtures. The wrapping may be made up of one or two or more layers of the water-soluble film material. The water-soluble film material of the first layer and of the additional layers, if present, may be the same or different.

The water-soluble packaging, comprising the detergent and the water-soluble wrapping, may have one or more chambers. A liquid formulation may be contained in one or more chambers, if present, of the water-soluble wrapping. The amount of detergent preferably corresponds to the full or half dose required for a washing or cleaning cycle. It is preferable for the water-soluble wrapping to contain polyvinyl alcohol or a polyvinyl alcohol copolymer. Suitable water-soluble films for producing the water-soluble wrapping are preferably based on a polyvinyl alcohol or a polyvinyl alcohol copolymer of which the molecular weight is in the range of from 10,000 to 1,000,000 g/mol, preferably from 20,000 to 500,000 g/mol, particularly preferably from 30,000 to 100,000 g/mol, and in particular from 40,000 to 80,000 g/mol. Polymers selected from the group comprising acrylic acid-containing polymers, polyacrylamides, oxazoline polymers, polystyrene sulfonates, polyurethanes, polyesters, polyethers, polylactic acid, and/or mixtures of the above polymers may additionally be added to a film material suitable for producing the water-soluble wrapping. Preferred polyvinyl alcohol copolymers include, in addition to vinyl alcohol, dicarboxylic acids as further monomers. Suitable dicarboxylic acids are itaconic acid, malonic acid, succinic acid, and mixtures thereof, with itaconic acid being preferred. Polyvinyl alcohol copolymers which include, in addition to vinyl alcohol, an ethylenically unsaturated carboxylic acid, or the salt or ester thereof, are also preferred. Polyvinyl alcohol copolymers of this kind particularly preferably contain, in addition to vinyl alcohol, acrylic acid, methacrylic acid, acrylic acid ester, methacrylic acid ester, or mixtures thereof. Suitable water-soluble films for use in the wrappings of the water-soluble packaging according to the invention are films that are sold by MonoSol LLC, for example under the names M8630, C8400, or M8900. Other suitable films include films named Solublon® PT, Solublon® GA, Solublon® KC, or Solublon® KL from Aicello Chemical Europe GmbH or the films VF-HP from Kuraray. The water-soluble packaging can have a substantially dimensionally stable spherical or pillow-shaped design with a circular, elliptical, square, or rectangular basic shape. The water-soluble packaging may have one or more chambers for storing one or more detergent formulations.

EXAMPLES

Example 1: Synthesis of Rose Bengal Functionalized Polymer (S1)

A) Synthesis of Alkene Functionalized Rose Bengal (ARB)

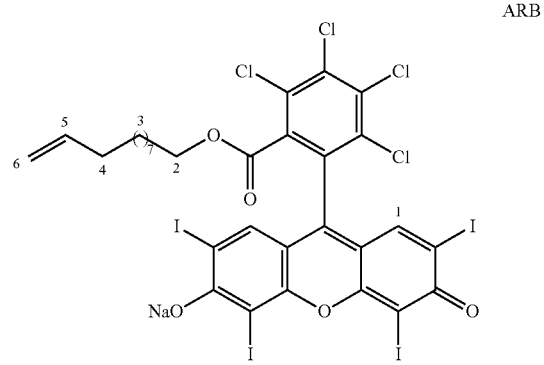

In a 24 ml crimp cap vial equipped with a magnetic stir bar, 500 mg (1 eq., 0.43 mmol) Rose Bengal (RB) were dissolved in 1 ml dimethylformamide (DMF) and 200 mg (188 µl, 2 eq., 0.86 mmol) 11-bromo-1-undecene were added. The vial was crimped shut and the mixture was sparged with argon for approximately 10 min, then heated to 80° C. in an aluminium heating block and stirred overnight. The DMF was removed in vacuo and the residue was taken up in a mixture of dichloromethane (DCM) and methanol (1/1, vol/vol), approximately 5 g celite were added and the solvents were removed under rotary evacuation. The celite loaded with the crude compound was transferred into an Interchim® dry load column and purified via chromatography on silica using a 9/1 (vol/vol) mixture of DCM and methanol. 350 mg of the target compound ARB were isolated between Rf 0.3 and Rf 0.5.

$^1$H-NMR (600 MHz, Methanol-$d_4$) δ/ppm=7.53 (s, 2H, CH), 5.84-5.77 (m, 1H, C5H), 4.97-4.88 (dd, 2H, C6H$_2$), 3.97 (t, 2H, C2H$_2$), 2.02 (q, 2H, C4H$_2$), 1.37-0.91 (m, 14H, C3H$_2$)

LC/MS: Calculated for $C_{31}H_{23}Cl_4I_4O_5^-$: 1124.64433; found: 1124.64566, $\Delta_{ppm}$=1.18 Molar attenuation coefficient ε (564 nm): 106655±3284 l·mol$^{-1}$·cm$^{-1}$ B) Synthesis of Poly(MPEGMA-GMA) (P1)

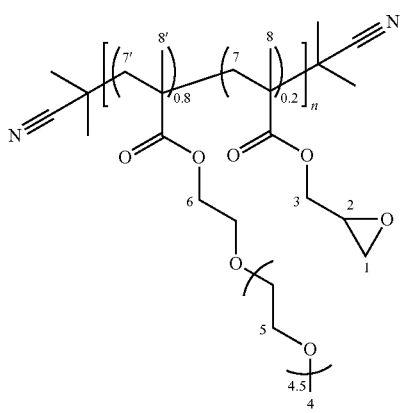

A stock solution of 33 mg (5 eq., 0.15 mmol) 2-cyano-prop-2-yl-dithiobenzoate (CPDB) and 5 mg (1 eq., 0.03 mmol) Azo-bis-isobutyronitrile (AIBN) in 7.61 ml DMF was prepared and sparged with argon for approx. 15 min in a crimped 12 ml septum vial. 2.16 g (2057 µl, 0.8 eq., 7.24 mmol) Methoxy (polyethyleneglycol) methacrylate (MPEGMA) and 257 mg (239 µl, 0.2 eq., 1.81 mmol) glycidyl methacrylate (GMA) were dissolved in 1 ml DMF in a 12 ml crimp cap vial equipped with a magnetic stir bar, 1 ml of the stock solution was added, the vial was crimped shut and the mixture was sparged with argon for approximately 15 min. The mixture was placed in a preheated (80° C.) aluminium heating block and stirred for 6 h. The polymerization was quenched by opening the vial to air and adding 10 ml tetrahydrofuran (THF). The solution was added dropwise to pentane/diethyl ether (2/1 vol/vol) under sonication to precipitate the pink polymer. To remove the RAFT end group the polymer was dissolved in a few ml DMF, a large excess of AIBN was added (approx. 20 mg) and the mixture was sparged with argon for approximately 15 min, then heated to 80° C. for 2 h. The polymer was again precipitated in pentane/diethyl ether (2/1 vol/vol), redissolved in THF, and precipitated again. After three precipitation cycles, P1 was obtained as a colorless viscous liquid and dried in vacuo (<0.02 mbar) for 48 h at 40° C.

SEC $M_n$=61 kg·mol$^{-1}$, $M_w$=78 kg·mol$^{-1}$, Đ 1.27

$^1$H-NMR (600 MHz,) δ/ppm=4.26 (b, C3H$_2$), 4.07 (b, C6H$_2$), 3.64 (b, C5H$_2$) 3.36 (b, C4H$_3$), 3.19 (b, C2H), 2.82 (b, C1H$_2$), 2.61 (b, C1H$_2$), 1.96-1.79 (m, C7H$_2$), 1.01-0.86 (m, C8H$_3$)

C) Synthesis of Rose Bengal Functionalized Polymer S1

In a 250 ml round bottom flask 13.5 mg (5 eq., 0.562 mmol) lithium hydroxide and 44.8 mg (37 µl, 1 eq., 0.112 mmol) pentaerythritol tetrakis(3-mercaptopropionate) were dissolved in 150 ml methanol. 150 mg (1 eq. GMA, 0.112 mmol) P1 were added to yield a polymer concentration of 1 mg·ml$^{-1}$. The reaction mixture was sparged with argon for approximately 15 min and stirred overnight at ambient temperature. 114 mg (1 eq., 0.112 mol) ARB and approximately 10 mg (0.5 eq.) AIBN were added to the reaction mixture. The mixture was sparged with argon for approximately 15 min and stirred for 72 h at 70° C. Approximately 30 mg (3 eq.) norbornene were added to the reaction mixture prior reduction of its volume to approx. 2 ml under rotary evaporation. The solution was loaded onto a Sephadex® LH-20 column (30×150 mm d×h) and subjected to preparative size exclusion chromatography in methanol. Due to the exclusion limit of the column (approx. 5 kg·mol$^{-1}$), S1 was not retained and eluted as the first fraction. An equal volume of acetonitrile was added to the purified methanol fraction and methanol removed under rotary evaporation (40° C., 100 mbar) and the product was stored under argon at −20° C. as a solution in acetonitrile-d$_3$.

SEC: Peak mass shifted to higher elution volume (20.74 min to 20.98 min, respectively 69.1 kg·mol$^{-1}$ to 58.3 kg·mol$^{-1}$), indicating compaction of the hydrodynamic radius of the polymer (4.43 nm to 4.09 nm) as is typical for Single-Chain Polymer Nanoparticles (SCNP).

Example 2: Detergency 400 ml of water and 1.25 g of a common household detergent (Persil Color®) were placed in a Petri dish and mixed, using a stirring bar. In a lightproof vessel, a stock solution of the Rose Bengal functionalized polymer S1 prepared in Example 1 in water with a concentration of 8.32 mg/ml was made. To obtain a 0.1 wt % or 1 wt % concentration of the photosensitizer in the reaction system, 150 µl or 1.5 ml of this stock solution were added to the Petri dish. A metal table was placed in the center of the Petri dish and a cotton textile with a standardized stain of colored butterfat, measuring 5×5 cm, was placed on top of it so that the textile was completely immersed in the aqueous liquor. A green LED lamp (525 nm) was set up above the Petri dish at a distance of 7 cm to the surface of the aqueous liquor. The textile was irradiated with an intensity of 100% (3 LEDs, each 1600 mW) for one hour. After the irradiation, the cotton textile was briefly rinsed in a water bath and then air-dried overnight under the exclusion of light. The dry cotton textile was evaluated using the LAB system, and its brightness (Y value) was determined. In the following table the increase of brightness affected by the treatment is given:

| | Y value: no photosensitizer | Y value: 0.1 wt % photosensitizer S1 | Y value: 1 wt % photosensitizer S1 |
|---|---|---|---|
| Colored butterfat | 72.92 | 74.12 | 74.40 |

What is claimed is:
1. A laundry detergent, comprising a cross-linked polymer obtainable by
   a) copolymerizing monomers of general formula (I) and general formula (II)

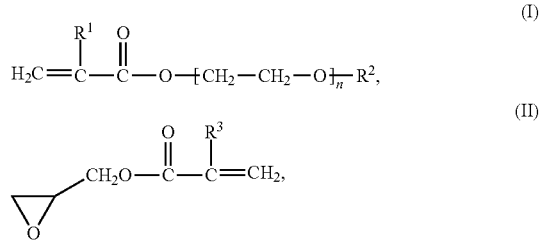

in which $R^1$, $R^2$, and $R^3$, independently of each other, are H or $CH_3$, and n is a number in the range of from 1 to 90, preferably from 5 to 50, b) crosslinking the copolymer with a polythiol crosslinker and functionalizing with a compound of general formula (III), $$H_2C=CH-R^4-Z \qquad (III),$$

in which $R^4$ is an alkyl group with from 2 to 12 carbon atoms, and Z is a colorant compound, being linked by one of its N- or O-atoms to $R^4$.

2. The detergent according to claim 1, wherein the crosslinked polymer is obtainable by employing in step a) monomers of general formula (I) and monomers of general formula (II) in molar ratios of from 51:49 to 95:5.

3. The detergent according to claim 1, wherein the monomer of general formula (I) is selected from the group consisting of poly-(ethylene glycol)-monomethylether-monomethacrylate ($M_n$ 300 to 4000 g/mol), 2-methoxyethyl methacrylate, 2-(2-methoxyethoxy)-ethyl methacrylate, ethylene glycol methacrylate, 2-methoxyethyl acrylate, ethylene glycol monoacrylate, and mixtures thereof.

4. The detergent according to claim 1, wherein the mean molecular weight (number average) of the copolymer of step a) is in the range of from 15,000 g/mol to 120,000 g/mol.

5. The detergent according to claim 1, wherein the colorant compound is selected from the group consisting of

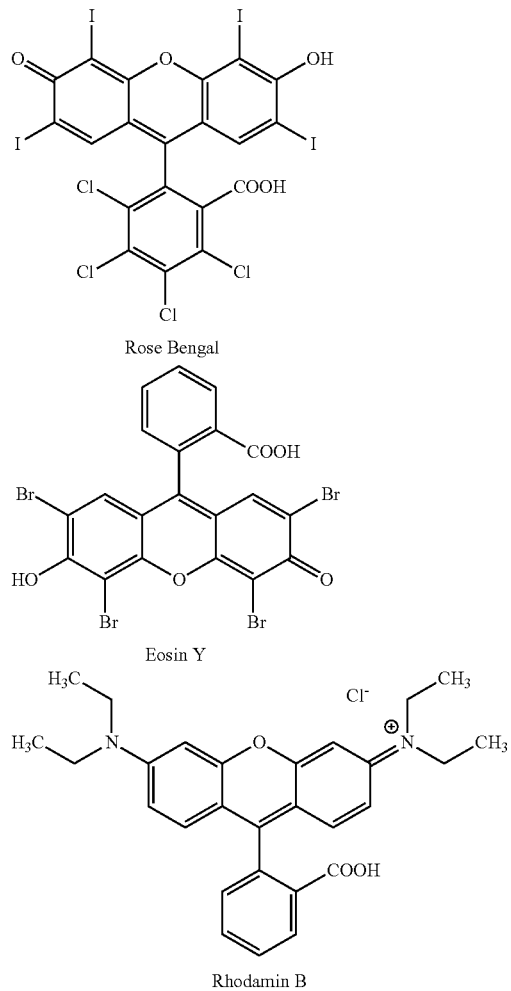

Rose Bengal

Eosin Y

Rhodamin B

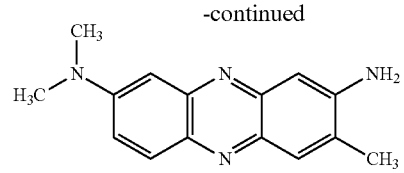

Neutral red

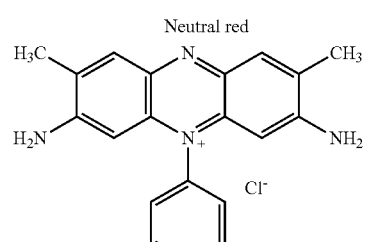

Safranin O

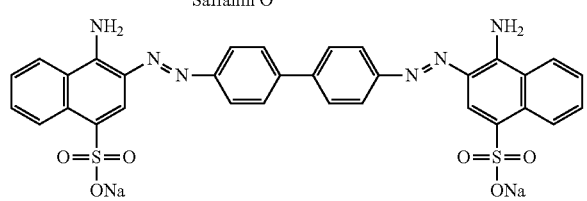

Kongo red

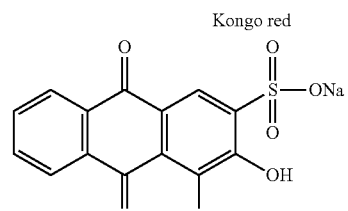

Alizarin red S

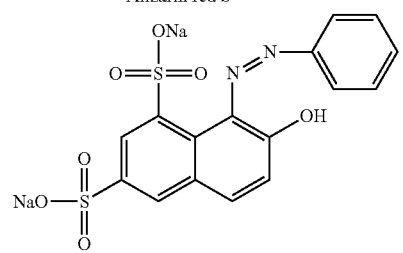

Orange G and mixtures thereof.

6. The detergent according to claim 1, wherein the thiol cross-linker is selected from the group consisting of pentaerythritol tetrakis(3-mercaptopropionate), 1,1,1-tris-(hydroxymethyl)-propan-tris-(3-mercaptopropionate), ethylene glycol-bis-mercaptoacetate, tetra(ethylene glycol)dithiol, ethylene mercaptan, 1,3-dimercapto-propan, 1,4-dimercapto-butan, 1,6-dimercapto-hexan, 1,8-dimercapto-octan, and mixtures thereof.

7. The detergent according to claim 1, wherein the crosslinked polymer comprises from 0.5% by weight to 0.001% by weight.

8. A process of laundering fabrics comprising contacting a fabric in need of cleaning with water and the detergent of claim 1, and irradiating the aqueous liquid comprising the fabric and the detergent with electromagnetic radiation with wavelengths in the range of from 450 nm to 600 nm, and intensities in the range of from 50 W/m² to 6000 W/m², for 5 minutes to 500 minutes.

9. The process according to claim 8, wherein the concentration of the detergent in the aqueous liquid is in the range of from 0.03 mg/l to 15 mg/l.

10. The process according to claim 8, wherein the concentration of the detergent in the aqueous liquid is in the range of from 0.4 mg/l to 4 mg/l.

11. The process according to claim 8, wherein the electromagnetic radiation wavelengths are in the range of from 475 nm to 550 nm, and intensities in the range of from 586 W/m² to 662 W/m², for 30 minutes to 90 minutes.

12. The detergent according to claim 1, wherein the cross-linked polymer is obtainable by employing in step a) monomers of general formula (I) and monomers of general formula (II) in molar ratios of from 70:30 to 80:20.

* * * * *